(No Model.)
A. H. SCHLUETER.
GAS REGULATOR FOR WATER HEATERS.
No. 514,428. Patented Feb. 6, 1894.
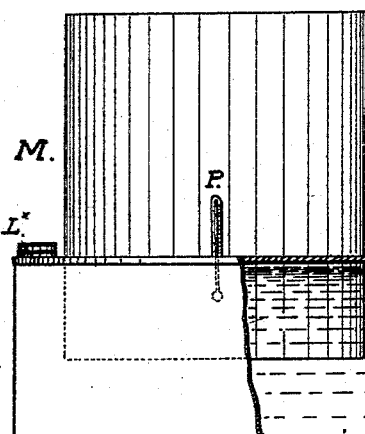
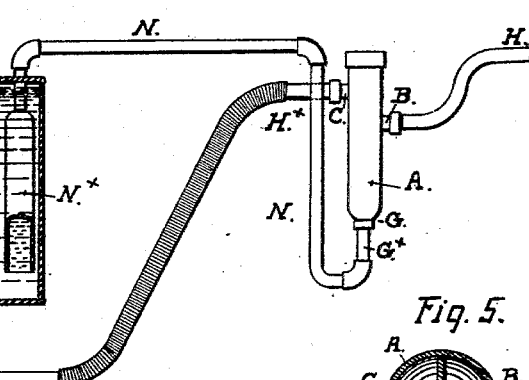
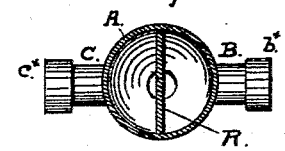
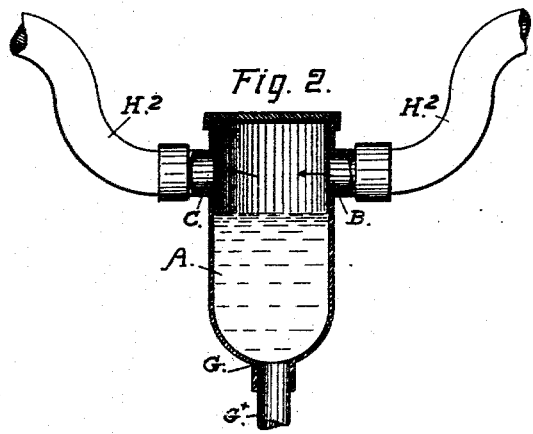
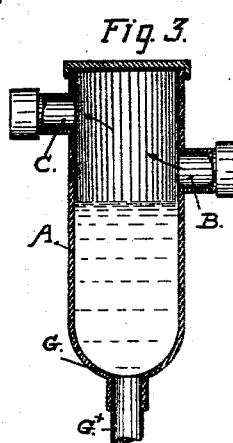
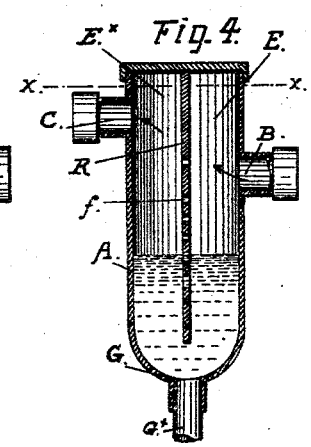
Witnesses:
M. Ragnse
William Franklin
Inventor:
Adolph H. Schlueter
by Smith & Osborn
his Attys.

UNITED STATES PATENT OFFICE.

ADOLPH H. SCHLUETER, OF OAKLAND, CALIFORNIA.

GAS-REGULATOR FOR WATER-HEATERS.

SPECIFICATION forming part of Letters Patent No. 514,428, dated February 6, 1894.

Application filed June 16, 1892. Serial No. 436,952. (No model.)

*To all whom it may concern:*

Be it known that I, ADOLPH H. SCHLUETER, a citizen of the United States, residing in Oakland, Alameda county, State of California, have invented certain new and useful Improvements in Gas-Regulators for Water-Heaters, of which the following is a specification.

My invention has for its object the production of an automatic regulator or governor for the burners of gas-stoves and heaters to be used in connection with a boiler or heater for water and other liquids, and the same consists in the described construction and combination of parts producing an improved regulator or device for increasing or reducing the supply of gas to a burner by or from the variations in the temperature of a body of water which constitutes the medium through which the heat of the burner is applied to a boiler or heater of liquids.

The nature of my said improvements and the manner in which I construct and produce the same are explained in the following description and the accompanying drawings forming part of this specification in which—

Figure 1 represents the device applied to a water-heater having a single gas-burner under it; the shell of the water vessel and the part of the regulator within it being broken away at one side of this figure to show the internal construction. Fig. 2 is a longitudinal section taken in a vertical plane through the center of the regulator. Fig. 3 is a modification of the form shown in Fig. 2, and is a similar section. Fig. 4 is a similar sectional view representing a construction in which the space in the regulator is divided by an upright partition into inlet and outlet compartments. Fig. 5 is a top view of Fig. 4.

A indicates the body of the regulator, B an inlet for gas at one side, and C an outlet at the opposite side through which the gas passes to the burner.

G is an opening in the bottom of the regulator body and $G^x$ is a pipe extending downwardly from this opening and connecting the regulator to the heater L.

The inlet and outlet in the upper space of the body have threaded sockets $b^x$ $c^x$ to receive the couplings of two pipes or tubes H $H^x$, one of which conducts the gas into the regulator while the other on the opposite side of the body connects the gas-burner K to the same space in the regulator.

L is a steam-tight vessel or heater filled with water and having a boiler or vessel M set into its top to hold the water or liquid which is to be heated. From the opening G in the bottom of the regulator a pipe N is carried into the water-space of the vessel L, and through this pipe the water is forced over into the chamber in the bottom of the regulator body. An opening in the top of the vessel is provided with suitable closing means such as a cap or plug $L^x$ for filling the vessel, and a thermometer P is also fixed in the top of the vessel for reading the temperature.

The pipes H $H^x$ may be either rigid or flexible, but it is better to make the connection between the vessel L and the regulator-body by a rigid pipe, especially where high temperature is produced in the liquid. The end of such pipe N which is located inside the vessel is carried down into the liquid and quite close to the bottom; so that the mouth of this pipe shall always be sealed against any back flow of gas into the vessel, and usually I make this portion of the pipe N somewhat larger in diameter, as shown at $N^x$, Fig. 1.

To prevent the water in the chamber of the regulator from passing over into the gas-pipe through the outlet G, I connect the pipe $H^x$ to the coupling on the regulator-body by elbows or upwardly turned portions $H^2$ as shown in Fig. 2, or in another way I place the outlet C at a point above the level of the inlet B and at a point above the highest level to which the water in the regulator will rise, when in action. This last mentioned arrangement of the inlet and outlet is shown in Fig. 3.

As thus constructed and arranged the operation is as follows: The vessel L being filled with water and the flame started at the burner, the opening $L^x$ at the top is kept open until the temperature indicated by the thermometer is raised to the degree which it is desired to maintain in the boiler M, and when that point is obtained the vessel L is tightly closed. Any increase of temperature in the water above the point at which the apparatus is thus adjusted to act, will force the liquid through the connecting pipe N into the chamber of the regulator and thereby reduces the area of the gas-passage through that chamber. Any rise of temperature in the vessel L therefore diminishes the flow of gas through the regulator to the burner and reduces the flame until the desired equilibrium between the heating agent and the temperature in the vessel is produced. On the other hand, the supply of gas is increased if the temperature falls. Instead of setting a boiler or vessel M into the heater, I sometimes arrange a coil of pipe in the heater L and thus apply the heat from the surrounding water to raise the temperature of a liquid being run through or held in the coil. One end of this coil is brought out through the top of the heater and the other end is carried through the side near the bottom where a faucet is attached.

The action of the regulator upon the gas can be made more delicate or gradual by fixing an upright partition R into the body in such manner that the chamber is divided into two compartments at the upper part, and the inlet side is separated from the outlet side, and then connecting one space or compartment with the other through the partition by several apertures $p$, $p$, at different heights. This construction is illustrated in Fig. 3, where the partition R extending from the top of the regulator down into the body of water in the bottom divides the space into an inlet compartment E and an outlet $E^\times$. One or more apertures are situated above the highest point to which the water will rise in the regulator under the pressure in the heater L, so that enough gas can pass into the outlet $E^\times$ to keep the burner from being altogether extinguished under the highest degrees of temperature to which the heater L may be raised. The regulator can be made still more sensitive by increasing the number of apertures below the line of the inlet B when the partition is used.

Having thus fully described my invention, what I claim, and desire to secure by Letters Patent, is—

1. The combination, of a closed vessel containing water, a gas-burner to apply heat to the water in said vessel, and a gas-regulator interposed in the gas-pipe supplying the burner consisting of a shell or body having in the bottom or lower part thereof a water-chamber, and in the upper part above said water chamber a gas-space, a gas supply pipe connected to said gas-space and a pipe connecting the burner with said gas-space and a pipe connecting the water-chamber of the regulator directly with the water-vessel and terminating below the level of the body of water in the vessel, whereby the water forced over into said water-chamber through the connecting pipe acts to contract the area of the gas-space of the regulator, substantially as described.

2. The combination of the closed water vessel L having an opening for introducing a liquid to be heated, a gas-burner K under said vessel, the regulator A having an inlet side E connected with a gas-supply pipe and an outlet side $E^\times$ to which the gas-burner is connected, a partition R between said compartments having apertures at different levels, an opening in the bottom of said body and a pipe connecting the interior of the vessel with said opening, constructed and arranged for operation substantially as specified.

In testimony that I claim the foregoing I have hereunto set my hand and seal.

ADOLPH H. SCHLUETER. [L. S.]

Witnesses:
EDWARD E. OSBORN,
L. L. M. SALSBURY.